(12) United States Patent
Grant

(10) Patent No.: US 7,525,969 B2
(45) Date of Patent: Apr. 28, 2009

(54) NAT PROCESSING IN A VRF ENVIRONMENT

(75) Inventor: Clinton Grant, Artarmon (AU)

(73) Assignee: Cisco Technology, Inc., San Jose, CA (US)

( * ) Notice: Subject to any disclaimer, the term of this patent is extended or adjusted under 35 U.S.C. 154(b) by 461 days.

(21) Appl. No.: 11/510,800

(22) Filed: Aug. 25, 2006

(65) Prior Publication Data

US 2008/0049752 A1 Feb. 28, 2008

(51) Int. Cl.
*H04L 12/56* (2006.01)
(52) U.S. Cl. .................. 370/392; 370/395.32; 370/401; 370/465; 370/475
(58) Field of Classification Search ........................ None
See application file for complete search history.

(56) References Cited

U.S. PATENT DOCUMENTS

| 6,832,322 | B1 * | 12/2004 | Boden et al. | ................... | 726/15 |
| 7,116,665 | B2 * | 10/2006 | Balay et al. | .................. | 370/392 |
| 2004/0218611 | A1 * | 11/2004 | Kim | ............................ | 370/401 |
| 2006/0013209 | A1 * | 1/2006 | Somasundaram | ........... | 370/389 |

OTHER PUBLICATIONS

The C7200 Router, by Cisco. http://www.cisco.com/warp/public/63/c7200_faulttree.html.

"Implement VRF Aware Services", Designing and Developing MPLS Networks (DDMN), Cisco Systems, Inc. 2004.
"NAT Integration with MPLS VPNs", Cisco IOS Release 12.2(13(T), http://www.cisco.com/univercd/cc/td/doc/product/software/ios122/122newft/122t/122t13/ftnatvpn.htm.
RFC 791, Internet Protocol, www.rfc-archive.org, Sep. 1981.
Steven M. Bellovin, "A Technique for Counting NATted Hosts", http://www.cs.columbia.edu/~smb/papers/fnat.pdf.

* cited by examiner

*Primary Examiner*—Wing F Chan
*Assistant Examiner*—Brian Roberts
(74) *Attorney, Agent, or Firm*—Abelman, Frayne & Schwab

(57) ABSTRACT

A method for packet routing includes receiving packets over a plurality of virtual private networks (VPNs). Each of the packets includes a respective virtual routing and forwarding (VRF) identifier indicative of a respective VPN over which the packet was transmitted. Each of the packets is assigned to a respective service class having a respective class identifier. For each packet among at least some of the packets, a respective key is computed based on the respective VRF identifier and the respective class identifier of the packet. The respective key is looked up in a configuration table to determine whether the packet is subject to network address translation (NAT). If the packet is subject to NAT, a new address is assigned to the packet, and the packet is forwarded using the new address.

16 Claims, 3 Drawing Sheets

NAT PROCESSING IN A VRF ENVIRONMENT

FIELD OF THE INVENTION

The present invention relates generally to packet network communications, and specifically to network address translation (NAT) in an environment that supports virtual routing and forwarding (VRF).

BACKGROUND OF THE INVENTION

A virtual private network (VPN) is a private communications network often used within a company, or by several different companies or organizations, to communicate confidentially over a publicly-accessible network. VPN message traffic can be carried over a public networking infrastructure, such as the Internet, using standard protocols, or over a service provider's private network. A VPN typically involves two parts: a protected "inside" network, which provides physical and administrative security to protect the transmission, and a less trustworthy, "outside" network." Many VPNs use network tunneling techniques, such as Multiprotocol Label Switching (MPLS) tunnels.

Virtual routing and forwarding (VRF) is commonly used in routing VPN traffic. VRF allows multiple instances of a routing table to co-exist within the same router at the same time. Typically, each VPN has its own routing table, as well as rules for determining how packets on the VPN are to be forwarded. Because the VRF instances are independent, the same or overlapping IP addresses may be used in different VPN instances without conflicting with one other.

VRF has been integrated with network address translation (NAT) to permit access to shared services from multiple VPNs, even when the devices in the different VPNs have overlapping IP addresses. A NAT-enabled gateway, such as a suitably-configured router located between the public Internet and a service provider's access network, rewrites the source and/or destination addresses of Internet Protocol (IP) packets that pass through the gateway. A small range of global IP addresses or a single global IP address is assigned by the gateway to represent the devices on each VPN. Each device on the VPN is given a local IP address that is used only within that VPN. When a local computer attempts to communicate with a remote computer situated outside the local network, the intermediary device matches the local IP address of the local computer to one of the global IP addresses. The intermediary device replaces the local address in data packets sent by the local computer with the matched global IP address, which is then used in communication on the public Internet. The gateway correlates the assigned global IP addresses with VPN information so that return traffic from the public Internet is routed back to the local IP address on the proper VPN.

The present invention will be more fully understood from the following detailed description of the embodiments thereof, taken together with the drawings in which:

DETAILED DESCRIPTION OF EMBODIMENTS

VRF-aware NAT enables network service providers to use a gateway router to provide multiple different VPN customers with Internet access and other central services, regardless of the private addressing schemes used by the customers within their own networks. It is desirable that the same gateway also be capable of classifying packet types and sources, and thus differentiating the service features that are to be applied to different packet classes. This classification may include determining which packets are to have their IP addresses changed by NAT, and which packets are to be transmitted without NAT processing.

The router in such cases must typically check both the VRF and packet classification parameters of the first packet in each new packet flow in order to determine whether this flow is subject to NAT processing. Considering the large number of different VRF instances and classifications that the router may support and the high volume of traffic that it must forward, this NAT checking step can place a substantial burden on the router. In order to alleviate this burden, the embodiments of the present invention that are described hereinbelow provide a compact data structure that the router can use to determine efficiently which packets are subject to NAT processing, along with methods for updating the data structure in response to changes in classification and VPN and NAT configurations.

Figure 1:
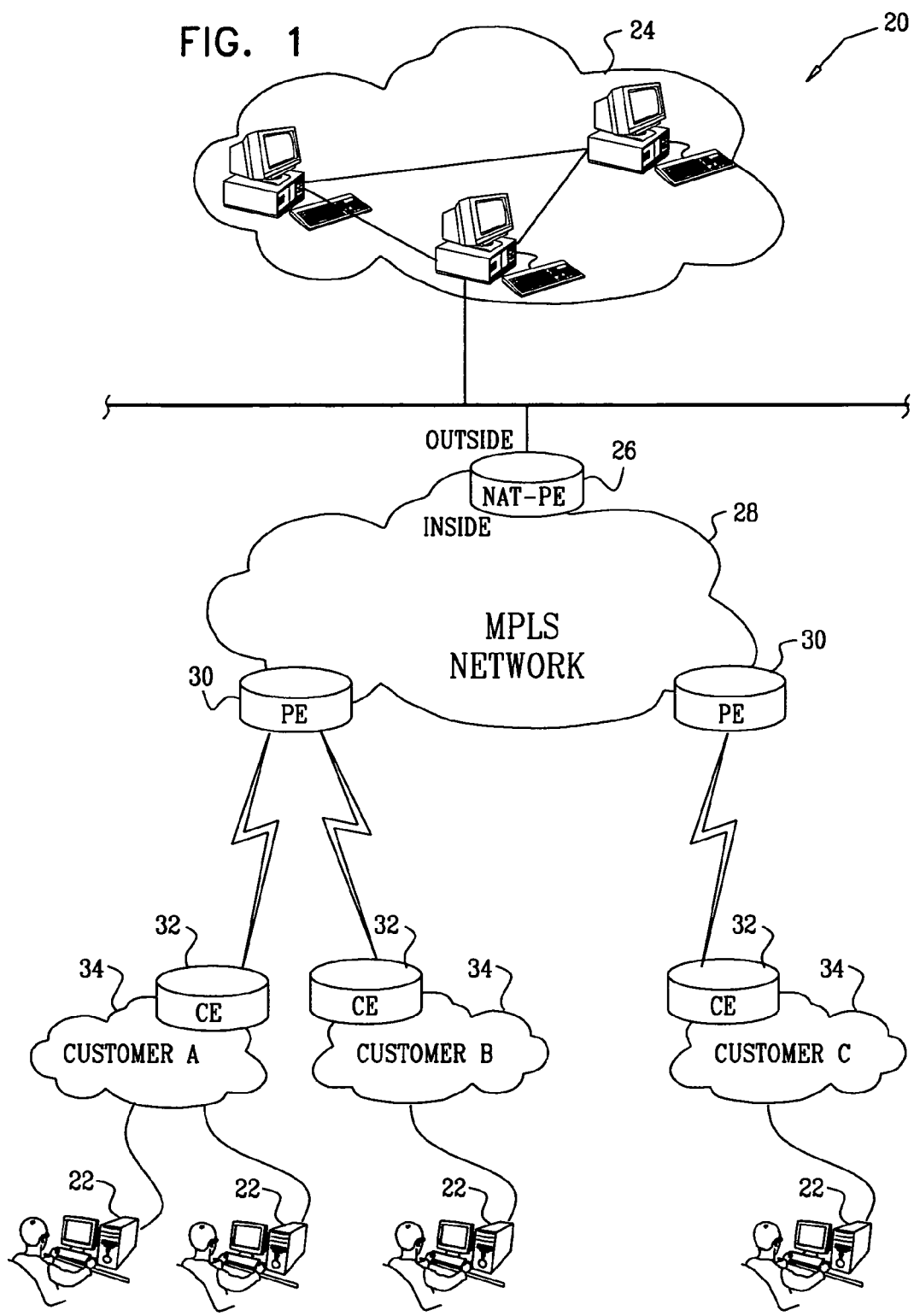
FIG. 1 is a block diagram that schematically illustrates a communication network, in accordance with an embodiment of the present invention.

FIG. 1 is a block diagram that schematically illustrates a packet communication network 20, in accordance with an embodiment of the present invention. Network 20 may be set up by a service provider, for example, to provide client computers 22 on private networks with access to a public network 24, such as the public Internet, as well as to other sorts of shared services. This network is illustrated here as an aid to understanding one possible implementation of the principles of the present invention. The particular configuration of network 20 is shown and described here, however, solely by way of example, and the principles of the present invention may similarly be implemented in other VRF-aware routers in which NAT is used.

A NAT-enabled provider-edge (NAT-PE) router 26 serves as the gateway between computers inside the service provider's access network and computers located outside this access network. Router 26 is linked by tunnels, such as MPLS tunnels through a MPLS access network 28, to other PE routers 30, which are typically also deployed by the service provider. Each of the tunnels may be used to carry traffic belonging to a particular VPN or to a number of VPNs. The tunnel ingress and egress points of the VPNs at PE routers 30 are linked to the corresponding customer networks 34 via customer-edge (CE) routers 34. PE routers 30 mark each packet transmitted from customer networks 34 with a label that indicates the VPN to which the packet belongs. NAT-PE router 26 uses this label as a VRF identifier for purposes of the routing and forwarding functions that the router performs, including the NAT functions that are described hereinbelow.

Figure 2:
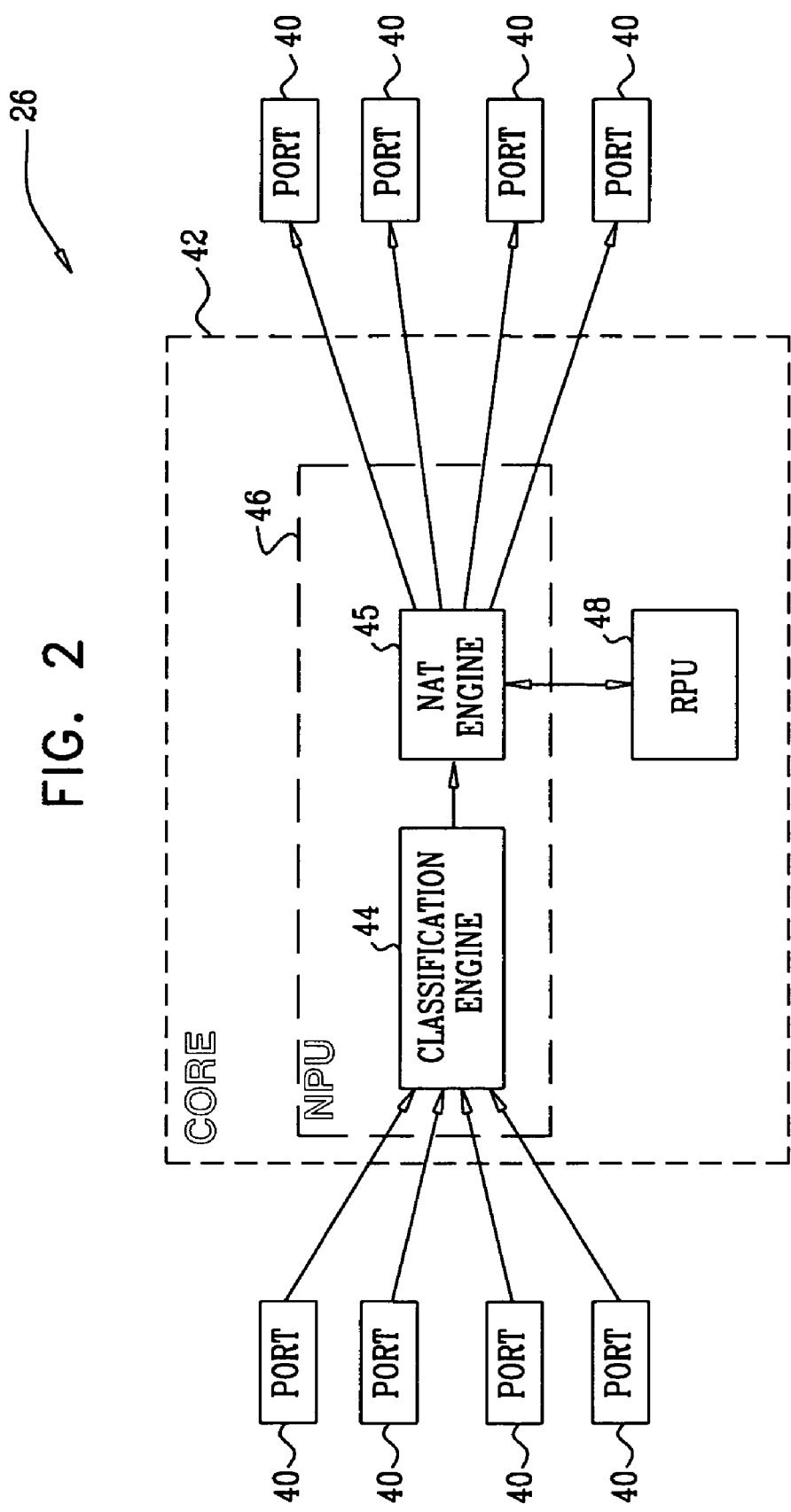
FIG. 2 is a block diagram that schematically illustrates elements of a provider-edge (PE) router, in accordance with an embodiment of the present invention.

FIG. 2 is a block diagram that schematically illustrates elements of NAT-enabled PE router 26, in accordance with an embodiment of the present invention. The router comprises multiple network ports 40, which are interconnected by a switching core 42. For simplicity and clarity, only those elements of router 26 that are useful in understanding the principles of operation of the present invention are shown in the figure. Although certain functions of router 26 are described hereinbelow as being carried out in core 42, at least some of these functions may alternatively be distributed among other components of the router, such as line cards.

Incoming packets from network 28 are processed by a classification engine 44, which assigns each packet to a respective class and marks the packet with a corresponding class identifier. In the present embodiment, engine 44 is implemented by a network processing unit (NPU) 46, which is also responsible for routing and forwarding functions, as described hereinbelow. Alternatively, the classification function may be performed by a separate hardware unit. The class assigned by engine 44 indicates the service features that are to be applied to each packet flow by router 26.

In some routers, the classifications and service features are determined by an access control list (ACL) mechanism, which may be configured by the network operator. Classification may be based on packet flow parameters such as the source and destination addresses, protocol, service type, and Layer 4 ports or port ranges. Each ACL defines a part of the overall flow space, and different ACLs may overlap. Thus, classification engine 44 typically assigns one class identifier to a region of a given ACL that overlaps a certain other ACL, and a different class identifier to another region of the ACL that does not overlap. This sort of classification is performed by many commercially-available routers, such as the C7200 router produced by Cisco Systems, Inc. (San Jose, Calif.). Alternatively, other packet classification methods may be used, as are known in the art.

Classification engine 44 may be capable of supporting a large number of different classifications, typically on the order of 10,000 classifications. Engine 44 may comprise a programmable processor, which is programmed in software to carry out the desired classification functions, or it may alternatively comprise a dedicated hardware processing unit, or a combination of hardware and software-based elements. The actual mechanism that is used by router 26 for packet classification, however, is beyond the scope of the present invention.

NPU 46 routes and forwards the classified packets to the appropriate ports 40 for egress to network 24. NPU 46 includes a NAT engine 45 for determining which packets are subject to NAT and changing the IP addresses of these packets appropriately, using internal look-up tables. Details of these functions and tables are described hereinbelow with reference to FIG. 3. Typically, NPU 46 must rapidly process a large volume of packets. Therefore, when NPU 46 receives the first packet of a new flow for which its internal tables do not contain complete NAT instructions, the NPU passes the packets to a route processing unit (RPU) 48. The RPU computes the necessary NAT data and loads the data into the tables of the NPU. RPU 48 may perform other functions, as well, but they are beyond the scope of the present patent application.

Figure 3:
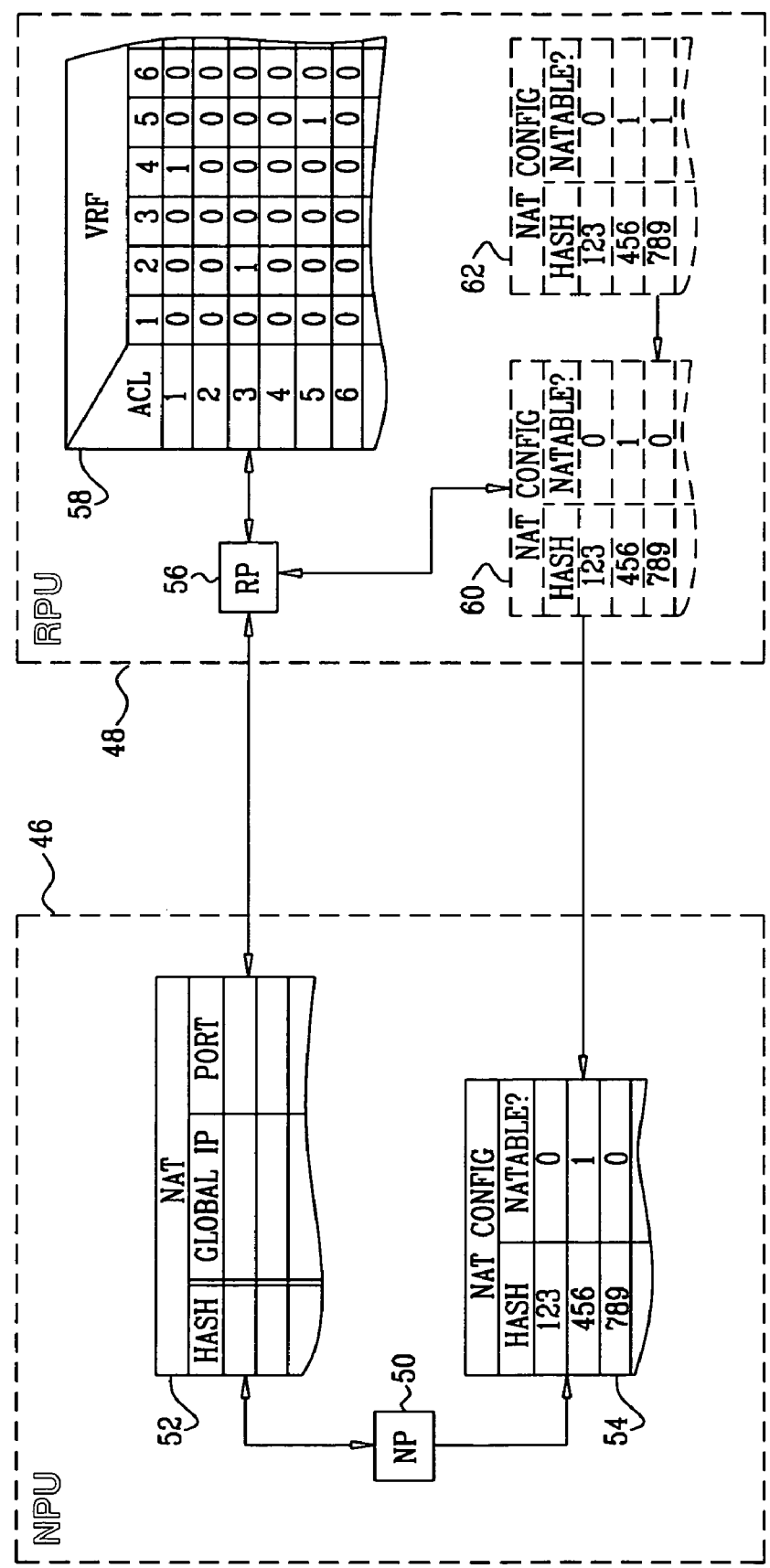
FIG. 3 is a block diagram that schematically shows details of network processing and route processing units used in a router, in accordance with an embodiment of the present invention.

FIG. 3 is a block diagram that schematically shows details of NPU 46 and RPU 48, in accordance with an embodiment of the present invention. This figure illustrates particular elements of the NPU and RPU that are relevant specifically to NAT processing performed by router 26. Other elements of the NPU and RPU are beyond the scope of the present patent application and are omitted for the sake of simplicity and clarity. On the other hand, although the present embodiment is tied to the particular architecture shown in FIG. 3, with dual processing units 46 and 48, the principles of the present invention may similarly be applied in routers of other types, which may use a single internal processor or multiple processors. The functions of NPU 46 and RPU 48 may be implemented in hardware-based logic or in software running on one or more programmable processors, or in a combination of hardware and software functions. To the extent that software functionality is used, the software may be downloaded to router 26 in electronic form, or it may be provided on tangible media, such as optical, magnetic or electronic memory media.

NPU 46 comprises a network processor 50, which uses information in tables 52 and 54 held in the NPU memory to make routing decisions. Typically, for speed of processing, NPU 46 comprises a single integrated circuit chip with both processor 50 and memory for tables 52 and 54. Upon receiving a packet from network 28 via a port for which NAT is enabled, for forwarding to network 24, processor 50 extracts packet header fields that identify the flow to which the packet belongs. For example, the processor may extract the 5-tuple of local IP source address, destination IP address, protocol, source port and destination port. The processor uses this information, together with the VRF identifier of the packet, to look up the flow in NAT table 52. For example, as shown in FIG. 3, the processor may compute a hash function based on the 5-tuple and VRF identifier as a key to table 52.

The entries in NAT table 52 are computed and entered in the table by RPU 48. If an entry exists in table 52, it indicates the global IP source address that is to be used in forwarding this packet over network 24. The entry may also indicate a different source port (such as a TCP or UDP port) to be used in the packet on network 24. Processor 50 substitutes the global source address into the packet, as well as the source port if required, and forwards the packet via the appropriate port 40 to network 24. (Table 52 can also be used to replace the global IP destination address of packets received by router 26 from network 24 with the appropriate local IP address and VRF identifier for delivery to computer 22 via network 28.)

Even if there is no entry in NAT table 52 corresponding to the header parameters (5-tuple) and VRF identifier of a given packet, the packet may still be subject to NAT. It may be, for example, that this is the first packet in a given flow from a certain local IP source address, and for this reason RPU 48 has not yet computed and entered the corresponding global IP address in table 52. (Since the total number of global IP addresses available to router 26 is typically less than the number of client computers 22 that the router serves, router 26 may use dynamic NAT, whereby entries in table 52 are typically updated dynamically when needed and "aged out" when no longer needed.)

To determine in this situation whether a given packet is "NATable" (i.e., subject to NAT), processor 50 consults NAT configuration table 54. This table is also computed and updated by RPU 48, as described hereinbelow. If the entry in table 54 indicates that the packet is NATable, processor 50 passes the packet to RPU 48, typically with an interrupt to indicate that a packet is awaiting processing. The RPU then extracts the header parameters and VRF identifier and computes the global IP source address and source port to be assigned to the packet. The RPU inserts the new global IP source address and the new source port (if required) in the packet, and forwards the packet to network 24. The RPU places an appropriate entry in NAT table 52 containing this information, so that subsequent packets in the same flow will be processed by NPU 46 directly.

Otherwise, if the packet is not NATable, processor 50 simply removes the VRF identifier and forwards the packet to network 24 without changing the IP source address or source port of the packet.

The "NATability" of each packet flow is configured on the basis of the class (ACL) to which the packets are assigned by classification engine 44 and the VRF instance of the packets. (The configuration is typically such that NAT will be applied to all packets that match the ACL.) The basic configuration information may be held in a two-dimensional bit array 58, which is indexed by the class and VRF identifiers. Each bit in the table is set or reset depending on whether the corresponding class/VRF combination is NATable. (For the sake of clarity in the description that follows, it is assumed arbitrarily that the bit value is set to one for combinations that are NATable, and to zero otherwise.) Since router 26 may typically support thousands of VPNs and tens of thousands of different traffic classes, table 58 may contain upward of 10 million entries. Furthermore, the actual information in the table is sparse, since most VPNs typically carry only a few classes of traffic. Because of the large size of this table, it is not desirable to hold the entire table in the on-chip memory of NPU 46.

Instead, RPU 48 computes a much more compact, one-dimensional version of the information in array 58 and loads it into NAT configuration table 54. This table is indexed by a key that is based on a combination of the packet class identifier and VRF identifier, such as a hash function computed over these two variables. Any suitable hash function or other computation may be used to calculate the key. For example, the VRF and class identifiers may be concatenated, and a cyclic redundancy code (CRC) may be computed over the result. For each pair of VRF and class identifiers that is actually used in network 20, RPU 48 computes the key and adds an entry to table 54 containing the key and the bit value indicating whether the combination to which the key corresponds is NATable. (Alternatively, to further reduce the NPU memory consumed by table 54, the table may have the form of a one-dimensional bit array, beginning at a predefined base address, with the offset of each bit relative to the base address given by the corresponding key value.) If multiple VRF/class identifier pairs map to the same key, and the bit value of any of the pairs is one, then the bit value corresponding to the key is set to one, i.e., the bit value is the result of an OR operation over the bit values of all pairs that may to the key.

Typically, depending on the choice of hash function, multiple VRF/class combinations may map to the same key. If any of these combinations is NATable, the corresponding bit value is set to one. Because of the sparseness of the information in table 58, the likelihood that two different combinations, one of which is NATable and the other not, will map to the same key is low. The hash function may be chosen so that the probability of this sort of collision is less than a predefined threshold.

Processor 50 computes the key for each incoming packet (or at least each packet that does not have an entry in NAT table 52) and uses the key to look up the NATability bit value in table 54. As noted above, if the value is set to one, NPU 46 refers the packet to RPU 58 for NAT computation. In the rare event that a non-NATable packet is referred to the RPU because of key overlap in table 54, the RPU will simply determine that the packet is not NATable by reference to table 58, and will set the global IP source of the packet to be the same as its local IP source address.

Compiling and loading table 54 into memory of NPU 46 can be a time-consuming operation. Furthermore, it may be necessary from time to time to update entries in table 54 when there are configuration and/or classification changes. It is desirable that RPU 48 be capable of making changes to certain entries in table 54 without having to reload the entire table.

For this purpose, in the embodiment shown in FIG. 3, RPU 48 maintains two shadow tables in memory: an online table 60, which mirrors the current contents of table 54 in NPU 46, and an offline table 62. A route processor 56 computes table 62 based on the current contents of array 58, and updates the table entries periodically and/or when there are changes to array 58. After the initial compilation of table 62, the entire table is loaded into table 54 and into online table 60. Subsequently, when processor 56 recompiles table 62 after changes have been made to the bit values in array 58, it checks the new bit values against the mirrored values in table 60. Since multiple VRF/class identifier pairs may map to the same key, as noted above, a change in one of the bit values in array 58 will not necessarily cause a change in the corresponding bit value in table 62. To the extent that there are discrepancies between tables 62 and 60, due to particular bits having been set or reset, processor 56 loads only the discrepant values into tables 54 and 60. As a result, only a minimal amount of communication bandwidth is consumed in updating table 54 while router 26 is running.

Updates to table 54 may be triggered by certain types of events that are detected by RPU 48. For example, when a bit is set in table 58 for a given VRF/class combination due to a configuration change, processor 56 may immediately compute the corresponding entry that is to be changed in tables 54, 60 and 62, and may then set the corresponding bit in the tables to ensure that packets with this VRF/class combination are routed properly.

Another type of event that may trigger an update to table 54 can occur when certain packets are passed from NPU 46 to RPU 48 for processing. Such an event may occur, for example, when the first packet of a new flow is passed from NPU 46 to RPU 48. This new flow may require a class identifier to be allocated. Upon passing the packet to the RPU, the NPU generates an interrupt to processor 56. As a result, the processor allocates a class identifier and then checks the VRF/class identifier pair in array 58. If the processor determines that the VRF/class pair is NATable according to array 58, it checks the corresponding bit value in table 60. If processor 56 determines that there is a discrepancy between the corresponding bit values in table 60 and array 58 (meaning that a new value has been computed due to a configuration change but has not yet been updated in table 54), it immediately loads the new value into tables 54 and 60. Subsequently, when recompilation of table 62 is complete, processor 56 will determine that the bit values of this entry are the same in tables 60 and 62, so that no further change is required.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for packet routing, comprising:
   receiving packets over a plurality of virtual private networks (VPNs), each of the packets comprising a respective virtual routing and forwarding (VRF) identifier indicative of a respective VPN over which the packet was transmitted;
   assigning each of the packets to a respective service class having a respective class identifier; and
   for each packet among at least some of the packets:
      computing a respective key based on the respective VRF identifier and the respective class identifier of the packet;
      looking up the respective key in a configuration table to determine whether the packet is subject to network address translation (NAT); and
      if the packet is subject to NAT, assigning a new address to the packet, and forwarding the packet using the new address.

2. The method according to claim 1, wherein each of the packets has a respective local Internet Protocol (IP) address within the respective VPN, and wherein the new address comprises a global IP address, and wherein assigning the new address comprises creating an entry in a NAT table comprising the respective local IP address, the respective VRF identifier, and the global IP address.

3. The method according to claim 1, wherein computing the respective key comprises computing a hash function over a concatenation of the VRF identifier and the class identifier.

4. The method according to claim 1, and comprising:
providing a two-dimensional bit array, comprising bit values that indicate, for each combination among a plurality of combinations of VPN identifiers and class identifiers, whether the combination is subject to NAT; and
compiling the combinations of the VPN identifiers and class identifiers with the bit values to generate the configuration table as a one-dimensional table indexed by key corresponding to each combination.

5. The method according to claim 4, wherein looking up the respective key and forwarding the packets are performed by a first processor having a first memory, and wherein compiling the combinations comprises generating the configuration table using a second processor having a second memory, and loading the configuration table generated by the second processor into the first memory.

6. The method according to claim 5, wherein compiling the combinations comprises identifying, using the second processor, one or more entries in the configuration table that have changed since loading the configuration table into the memory of the first processor, and loading only the one or more changed entries from the second processor into the first memory.

7. The method according to claim 6, wherein identifying the one or more entries comprises maintaining a copy of the configuration table in the second memory, and comparing the bit values in the copy of the configuration table to new bit values computed by the second processor based on the two-dimensional bit array in order to identify the one or more entries that have changed.

8. The method according to claim 6, wherein identifying and loading the one or more entries comprise identifying and loading the one or more entries responsively to an event comprising a configuration change or an interrupt issued to the second processor.

9. Apparatus for packet routing, comprising:
a plurality of ports, which are configured to receive packets on a plurality of virtual private networks (VPNs), each of the packets comprising a respective virtual routing and forwarding (VRF) identifier indicative of a respective VPN over which the packet was transmitted; and
a network processing unit (NPU), which is arranged to assign each of the packets to a respective service class having a respective class identifier, and which is arranged to process each packet among at least some of the packets so as to compute a respective key based on the respective VRF identifier and the respective class identifier of the packet, to look up the respective key in a configuration table to determine whether the packet is subject to network address translation (NAT), and if the packet is subject to NAT, to assign a new address to the packet, and to forward the packet using the new address.

10. The apparatus according to claim 9, wherein each of the packets has a respective local Internet Protocol (IP) address within the respective VPN, and wherein the new address comprises a global IP address, and comprising a route processing unit (RPU), which is arranged to create an entry in a NAT table comprising the respective local IP address, the respective VRF identifier, and the global IP address, wherein the NPU is arranged to assign the new address using the entry in the NAT table.

11. The apparatus according to claim 9, wherein the respective key is determined by computing a hash function over a concatenation of the VRF identifier and the class identifier.

12. The apparatus according to claim 9, wherein the NPU has a first memory, and comprising a route processing unit (RPU), which has a second memory that is configured to store a two-dimensional bit array, comprising bit values that indicate, for each combination among a plurality of combinations of VPN identifiers and class identifiers, whether the combination is subject to NAT, and
wherein the RPU is arranged to compile the combinations of the VPN identifiers and class identifiers with the bit values to generate the configuration table as a one-dimensional table indexed by key corresponding to each combination, and to load the configuration table into the first memory.

13. The apparatus according to claim 12, wherein the RPU is arranged, after loading the configuration table into the first memory, to identify one or more entries in the configuration table that have changed since loading the configuration table into the first memory, and to load only the one or more changed entries into the first memory.

14. The apparatus according to claim 13, wherein the RPU is arranged to maintain a copy of the configuration table in the second memory, and to compare the bit values in the copy of the configuration table to new bit values computed by the RPU based on the two-dimensional bit array in order to identify the one or more entries that have changed.

15. The apparatus according to claim 13, wherein the RPU is arranged to identify and load the one or more entries that have changed responsively to an event comprising a configuration change or an interrupt issued to the second processor.

16. Apparatus for packet routing, comprising:
means for receiving packets over a plurality of virtual private networks (VPNs), each of the packets comprising a respective virtual routing and forwarding (VRF) identifier indicative of a respective VPN over which the packet was transmitted;
means for assigning each of the packets to a respective service class having a respective class identifier; and
means for operating on each packet among at least some of the packets so as to compute a respective key based on the respective VRF identifier and the respective class identifier of the packet, to look up the respective key in a configuration table to determine whether the packet is subject to network address translation (NAT), and if the packet is subject to NAT, to assign a new address to the packet, and to forward the packet using the new address.

* * * * *